(12) United States Patent
Lubomirsky et al.

(10) Patent No.: US 11,473,168 B2
(45) Date of Patent: Oct. 18, 2022

(54) METHOD FOR PLATINUM GROUP METALS RECOVERY FROM SPENT CATALYSTS

(71) Applicant: YEDA RESEARCH AND DEVELOPMENT CO. LTD., Rehovot (IL)

(72) Inventors: Igor Lubomirsky, Petach-Tikva (IL); Valery Kaplan, Rehovot (IL); Ilya Bronshtein, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 684 days.

(21) Appl. No.: 16/345,739

(22) PCT Filed: Oct. 30, 2017

(86) PCT No.: PCT/IL2017/051179
§ 371 (c)(1),
(2) Date: Apr. 29, 2019

(87) PCT Pub. No.: WO2018/078632
PCT Pub. Date: May 3, 2018

(65) Prior Publication Data
US 2019/0256948 A1      Aug. 22, 2019

(30) Foreign Application Priority Data
Oct. 30, 2016    (IL) .......................................... 248600

(51) Int. Cl.
C22B 11/02          (2006.01)
C22B 11/06          (2006.01)

(52) U.S. Cl.
CPC ............ C22B 11/026 (2013.01); C22B 11/06 (2013.01); *Y02P 10/20* (2015.11)

(58) Field of Classification Search
CPC ....... C22B 11/026; C22B 11/06; C22B 1/005; C22B 1/08; C22B 7/009; C22C 1/0466; C22C 5/04; B22F 2301/25
See application file for complete search history.

(56) References Cited

U.S. PATENT DOCUMENTS

| | | | |
|---|---|---|---|
| 2,828,200 A | 3/1958 | Nixon | |
| 3,021,209 A * | 2/1962 | Murray | C22B 11/026 75/631 |
| 3,951,648 A | 4/1976 | Stern et al. | |
| 3,986,982 A | 10/1976 | Crowson et al. | |
| 4,074,865 A | 2/1978 | Gibbon | |
| 4,353,740 A | 10/1982 | Dunn | |
| 4,960,573 A | 10/1990 | Okutani et al. | |
| 5,102,632 A | 4/1992 | Allen et al. | |
| 5,104,445 A * | 4/1992 | Dubrovsky | C22B 1/08 75/585 |
| 6,455,018 B1 | 9/2002 | Cuif | |
| 7,291,202 B2 | 11/2007 | Asano et al. | |
| 7,972,412 B2 | 7/2011 | Bergeron et al. | |
| 2007/0131058 A1 | 6/2007 | Bergeron et al. | |
| 2008/0083300 A1 | 4/2008 | Evans | |
| 2016/0145714 A1 | 5/2016 | Liddell et al. | |
| 2017/0145542 A1 | 5/2017 | Lubomisky et al. | |

FOREIGN PATENT DOCUMENTS

| | | |
|---|---|---|
| CN | 1904094 A | 1/2007 |
| CN | 102923796 A | 2/2013 |
| CN | 103258730 A | 8/2013 |
| CN | 105400962 A | 3/2016 |
| EP | 0396252 A1 | 11/1990 |
| GB | 798712 A | 7/1958 |
| JP | S 5032018 A | 3/1975 |
| JP | S 51123723 | 10/1976 |
| JP | H 02301528 A | 12/1990 |
| JP | H 0313532 A | 1/1991 |
| JP | 2012219326 A | 12/2012 |
| KR | 100959928 B1 | 10/2009 |
| WO | WO 2008/131856 A2 | 11/2008 |
| WO | WO 2014/091456 A1 | 6/2014 |
| WO | WO 2015/193901 A1 | 12/2015 |

OTHER PUBLICATIONS

Dhanlal De Lloyd "Standard sieves and Mesh sizes," Chem. Dept, The University of The West Indies, St. Augustine campus (Year: 2004).*
Dong et al. "Recovery of platinum group metals from spent catalysts: a review" International Journal of Mineral Processing. Dec. 10, 2015;145:108-13.
Fornalczyk et al. "Removal of platinum group metals from the used auto catalytic converter" Metalurgija. Apr. 1, 2009;48(2):133-6.
Fornalczyk A. "industrial catalysts as a source of valuable metals" JAMME. 2012;55(2):864-68.
Hagelüken BC. "Recycling the platinum group metals: a European perspective" Platinum Metals Review. Jan. 1, 2012;56(1):29-35.
Hoffmann JE. "Recovery of piatinum-group metals from gabbroic racks metals from auto catalysts" JOM. Jun. 1, 1988;40(6):40-4.
International Search Report for PCT Application No. PCT/IL2017/051179 dated Feb. 1, 2018.

(Continued)

*Primary Examiner* — Anthony J Zimmer
*Assistant Examiner* — Dean Mazzola
(74) *Attorney, Agent, or Firm* — Mark S. Cohen; Pearl Cohen Zedek Latzer Baratz LLP

(57) ABSTRACT

A method for recovery of platinum group metals from a spent catalyst is described. The method includes crushing the spent catalyst to obtain a catalyst particulate material including particles having a predetermined grain size. The method includes subjecting the catalyst particulate material in the reaction zone at a predetermined temperature for a predetermined time period in contact with solid chlorine-containing material and solid silicon-containing material to obtain volatile platinum group metal-containing chloride product, and cooling to convert the product into solid phase platinum group metal-containing materials.

14 Claims, 1 Drawing Sheet

(56) References Cited

OTHER PUBLICATIONS

Kim et al. "Effects of carbon monoxide addition to chlorine plasma-treated platinum films" Applied surface science. Feb. 2, 2000;156(1-4):9-15.

Kim et al. "A process for extracting precious metals from spent printed circuit boards and automobile catalysts" JOM. Dec. 1, 2004;56(12):55-8.

Ojeda et al. "Recovery of palladium from an exhausted catalyst by chlorination: effect of carbon content and thermal treatment" Transactions of the Institution of Mining and Metallurgy. Section C. Mineral Processing and Extractive Metallurgy. Jan. 1999;108.

Yoo JS. "Metal recovery and rejuvenation of metal-loaded spent catalysts" Catalysis Today. Sep. 30, 1998;44(1-4):27-46.

Itakura et al. "Resource recovery from Nd—Fe—B sintered magnet by hydrothermal treatment" Journal of Alloys and Compounds. Feb. 9, 2006;408:1382-5.

Kamimoto et al. "Electrodeposition of rare-earth elements from neodymium magnets using molten salt electrolysis" Journal of Material Cycles and Waste Management. Oct. 2018;20(4):1918-22.

"Kiln" Merriam-Webster.com dictionary, Merriam-Webster, https://www.merriam-webster.com/dicitonary/kiln. Accessed Feb. 9, 2022.

Office Action for Chinese Patent Application No. 201880071337.8 dated Sep. 29, 2021. This Office Action cites Zhang of item 17 and Zhang of item 18.

Shirayama et al. "Selective extraction and recovery of Nd and Dy from Nd—Fe—B magnet scrap by utilizina molten MgCl2" Metallurgical and Materials Transactions B. Jun. 2018;49(3):1067-77.

Zhang et al. "Gold Extraction Technolog" 2013 Beijing: Metallurgical Industry Press. (English translation not available; however see item 15).

Zhang et al. "Modern Gold Smelting Technology" 2014 Beijing: Metallurgical Industry Press. (English translation not available; however see item 15).

* cited by examiner

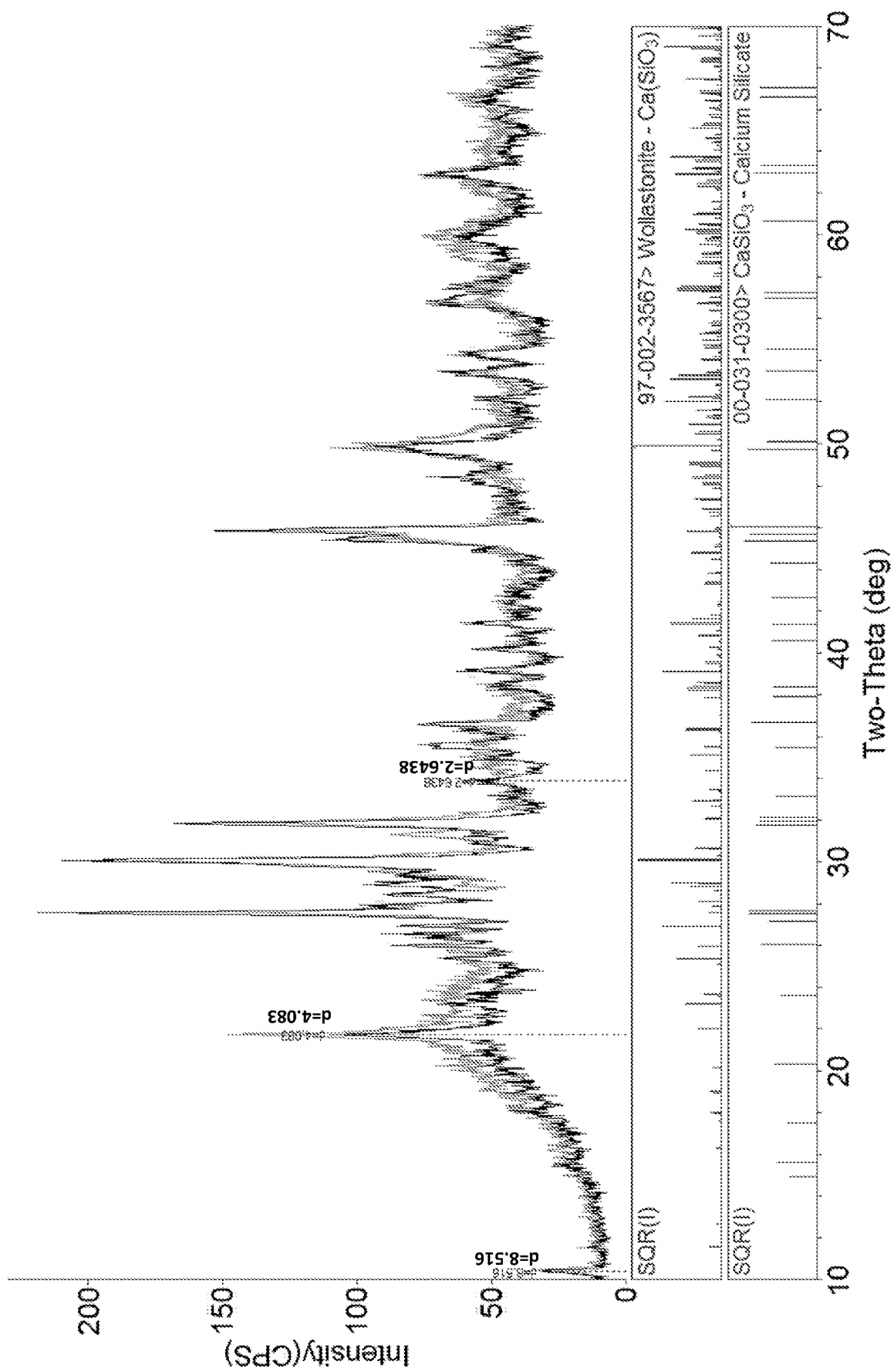

METHOD FOR PLATINUM GROUP METALS RECOVERY FROM SPENT CATALYSTS

CROSS-REFERENCE TO RELATED APPLICATIONS

This application is a National Phase Application of PCT International Application No. PCT/IL2017/051179, International Filing Date Oct. 30, 2017, claiming the priority of IL. Patent Application No. 248600, filed Oct. 30, 2016 which are hereby incorporated by reference.

FIELD OF THE INVENTION

The present invention relates to metallurgical techniques employed for separation and recovery of precious and rare metals, and specifically, to a method for recovery of platinum group metals from spent catalysts.

BACKGROUND OF THE INVENTION

Platinum group metals, e.g., platinum (Pt), palladium (Pd) and rhodium (Rh), are well-known precious metals playing an important role in many industrial applications such as jewellery and ornaments, electronics, telephone circuits, dental alloys, etc. Platinum and palladium have also long been used as reforming and hydrogenation catalysts in the petroleum or automobile industries, respectively. In the catalysts, small amounts of platinum or palladium are contained in large volumes of support materials, typically as a metal coat supported on alumina, zirconia or silica.

The petroleum or automobile industry catalysts containing platinum or palladium are usually discarded when its catalytic function deteriorates. Palladium content in the catalysis usually varies from 0.4 mass percent to 5.0 mass percent. Likewise, platinum, ruthenium and osmium content can vary from 0.1 mass percent to 0.5 mass percent. The spent catalysts may also contain 1.5-2.5 mass percent of rhenium and 3.0-5.0 mass percent of vanadium. Due to its low natural abundance, high price and increasing demands in various fields of industry, recovering and refining platinum group metals from various spent materials can be highly advantageous. Therefore, efficient recovery and purification of precious metals from spent catalysts has economic benefits.

Platinum and palladium in spent petroleum or automobile industry catalysts can be recovered through various hydrometallurgical or pyrometallurgical techniques. A hydrometallurgical treatment generally includes crushing (e.g., grinding and milling), leaching, filtration, and washing stages, which are followed by extraction of palladium from a solution (cementation or electrochemical process). The treatment may also include neutralization of the acid waste solution, filter cakes and acid off-gases.

For example, U.S. Pat. No. 6,455,018 describes a complex non-selective process for extraction of precious metals, e.g., platinum, palladium and rhodium from spent catalytic converters by grinding the catalysts, treating with sulphuric acid; calcination of the mixture between 150° C. and 450° C., leaching with chlorides and hydrochloric acid to obtain a solution of noble metals and any other metals along with a solid residue.

Basically, there are three process routes for hydrometallurgical treatment. The first route includes partial destruction of the alumina or zirconia catalyst support substrate and high-temperature chloritization with chlorine gas. In this case, palladium is completely transformed and the support substrate is partially transformed into solution or melt. Platinum or palladium can, for example, be extracted directly from a catalyst support substrate using leachates. As such, the catalyst can, for example, be leached in aqua regia or in hydrochloric acid with oxidants such as nitric acid, sodium chlorate, sodium hypochlorite and chlorine gas.

The second route includes full destruction of the alumina or zirconia catalyst support substrate. In this route, palladium and alumina are transformed into the solution or melt together. This route is based on total dissolution of the alumina substrate, thereby concentrating insoluble or sparingly soluble platinum and palladium into the residue.

The third route includes the processes of selected dissolution of palladium in solutions or in a metal collector with additional metal separation and palladium extraction without destruction of the alumina or zirconia catalyst substrate. In this case, palladium is completely transformed into solution or melt, whereas alumina remains in an insoluble form.

The disadvantages of conventional hydrometallurgical processes for recovery of platinum group metals from catalysts are associated with multistage processes, formation of large amounts of waste acidic or alkaline solutions. Likewise, these processes require a relatively great quantity of a metal-collector (e.g., Zn or Al) for extraction of the platinum group metals from the solution in the cementation stage of the process, usually in an amount of 7-8 times greater than the stoichiometric amount.

A conventional pyrometallurgical treatment of catalysts for recovery of platinum group metals generally includes a grinding (crushing and milling) stage and a smelting stage, followed by metal separation and palladium extraction from metal-collectors, for example, by an electrochemical process, along with slag treatment and neutralization of acid off-gases.

Precious metals within spent petroleum or automobile industry catalysts can also be recovered by chlorination at high temperature.

For example, U.S. Pat. No. 3,951,648 describes a process for recovering palladium from a spent catalyst having a palladium content of less than 5 percent. The method comprises putting the catalyst in contact with a gaseous chlorinated organic compound at a temperature sufficient for vaporizing the palladium and cooling the gaseous phase so as to recover the formed chlorinated palladium derivative.

U.S. Pat. No. 5,102,632 describes a two-stage method of recovering the noble metal content of a mixture of noble metals, e.g., platinum, palladium, and rhodium, from a spent catalyst. The method comprises first reductive chlorination at an elevated temperature by a gaseous chlorinating agent in the presence of a reducing agent (e.g., sulfur dioxide and carbon monoxide in stages). The method also comprises minimizing the amount of aluminum trichloride formed from either washcoat or underlying ceramic chlorination, and separating the aluminum trichloride or other washcoat chlorides from the products of chlorination of the noble metals, as by sublimation of the former in a reducing atmosphere at a temperature below the vaporization temperatures of the latter, thereby recovering the noble metal chlorides in a concentrated form. As a second stage, temperature is further increased in an atmosphere of chlorine alone, to volatilize rhodium trichloride for collection separately from the palladium and platinum chlorides volatilized previously in the first-stage reductive chlorination.

There is still a need for further improvement of a technique for recycling spent catalysts from the petrochemical, chemistry and automobile industries for recovery of platinum group metals from spent catalysts.

It would also be advantageous to have a method and apparatus for recovery of platinum group metals with low environmental impact agents able to extract palladium and/or other platinum group metals selectively and efficiently in mild conditions.

It would still be advantageous to have a method and apparatus for recovery of platinum group metals which can be easily industrialized and which would result in significant yield of the recovered metals.

The present disclosure satisfies the aforementioned need by providing a method for recovery of platinum group metals from a spent catalyst that includes one or more platinum group metals.

SUMMARY OF THE INVENTION

In one embodiment, this invention provides a method for recovery of platinum group metals from a spent catalyst, the method comprising:

obtaining a catalyst particulate material comprising platinum group metals from said spent catalyst wherein said particulate material has a predetermined grain size;

mixing said catalyst particulate material with a solid chlorine-containing material and a solid silicon-containing material in a reaction zone; subjecting said mixture in said reaction zone to a predetermined temperature for a predetermined time period; thereby reacting said platinum group metals with said solid chlorine-containing material and solid silicon-containing material;

and provide a volatile platinum group metal-containing chloride product in said reaction zone;

treating said reaction zone with oxygen-containing gas;

cooling said volatile platinum group metal-containing chloride product in a cooling zone to convert said volatile platinum group metal-containing chloride product into solid phase platinum group metal-containing materials.

In the present description and claims, the expression "platinum group metals" is broadly used, whether alone or in combination, to refer to all elements of the platinum group, namely the elements rhodium, palladium, iridium, platinum, ruthenium and osmium. Each represents a separate embodiment of this invention.

According to an embodiment of the present invention, obtaining a catalyst particulate material including particles having a predetermined grain size. For example, the predetermined grain size of said catalyst particulate material can be in the range of 30 microns to 200 mm.

According to an embodiment of the present invention, the method includes mixing the catalyst particulate material with a solid chlorine-containing material and a solid silicon-containing material. In another embodiment, the solid chlorine-containing material is selected from the group consisting of: alkali metal chlorides, alkaline earth metals chlorides, aluminum chloride, ammonium chloride and any combination thereof. Each represents a separate embodiment of this invention. In another embodiment, solid silicon-containing material is selected from the group consisting of: pure silica, silica-containing sand, silica-containomg waste and any combination thereof. Each represents a separate embodiment of this invention.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWING

In order to understand the invention and to see how it may be carried out in practice, embodiments will now be described, by way of non-limiting example only, with reference to the accompanying drawings, in which:

FIG. 1: XRD patterns of the calcium silicate after sintering of the catalyst particulate material with calcium chloride and silica addition.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, this invention provides a method for recovery of platinum group metals from a spent catalyst, the method comprising:

obtaining a catalyst particulate material comprising platinum group metals from said spent catalyst wherein said particulate material has a predetermined grain size;

mixing said catalyst particulate material with a solid chlorine-containing material and a solid silicon-containing material in a reaction zone;

subjecting said mixture in said reaction zone to a predetermined temperature for a predetermined time period; thereby reacting said platinum group metals with said solid chlorine-containing material and solid silicon-containing material; and provide a volatile platinum group metal-containing chloride product in said reaction zone;

treating said reaction zone with oxygen-containing gas;

cooling said volatile platinum group metal-containing chloride product in a cooling zone to convert said volatile platinum group metal-containing chloride product into solid phase platinum group metal-containing materials.

In the present description and claims, the expression "platinum group metals" is broadly used, whether alone or in combination, for all of the elements of the platinum group, namely the elements rhodium, palladium, iridium, platinum, ruthenium and osmium. Each represents a separate embodiment of this invention.

The spent catalysts, which contain the platinum group metals to be recovered, may be in various forms, namely, for example, in the form of pellets or in the form of monoliths. It will be appreciated that such catalysts are widely described in the art, both with respect to their structure and their composition.

The spent catalysts generally may contain various impurities, such as zirconia, silica, ceria, alumina, carbonaceous substances and the like. However, the method of the invention are insensitive to the presence of these impurities.

In one embodiment, the method of this invention comprises obtaining a catalyst particulate material comprising platinum group metals from said spent catalyst wherein said particulate material has a predetermined grain size. In another embodiment, the catalyst particulate material is obtained by crushing the spent catalyst. The term "crushing" refers to grinding or miling. This stage is required when a spent catalyst is in the form of a monolith. During the crushing, the catalyst is grinded, and thus converted into a particulate material whose mean particle size may range, for example from 30 microns to 200 mm. In another embodiment, the particulate material has mean particle size between 30 microns to 1 millimeters. In another embodiment, the particulate material has mean particle size between 100 microns to 1 millimeter. In another embodiment, the particulate material has mean particle size between 30 microns to 100 millimeter. In another embodiment, the particulate material has mean particle size between 30 microns to 100 millimeters. In another embodiment, the particulate material has mean particle size between 100 millimeters to 200 millimeters.

According to an embodiment of the present invention, the method includes mixing the catalyst particulate material with a solid chlorine-containing material with said solid chlorine-containing material and solid silicon-containing material in a reaction zone. In another embodiment, the solid chlorine-containing material comprises at least one chloride salt. In another ambodiment, the chloride salt is selected from the group consisting of: alkali metal chlorides, hypochlorite salts, alkaline earth metal chlorides, aluminum chloride, ammonium chloride and any combination thereof. In another embodiment, the solid chlorine-containing material is selected from alkali metal chloride, hypochlorite salt, alkaline earth metal chlorides, aluminum chloride and ammonium chloride. In another embodiment, the solid chlorine-containing material is an alkali metal chloride. In another embodiment, the solid chlorine-containing material is alkaline earth metals chloride. In another embodiment, the solid chlorine-containing material is aluminum chloride. In another embodiment, the solid chlorine-containing material is ammonium chloride. Examples of alkali metal chlorides include, but are not limited to, potassium chloride and sodium chloride. Examples of alkaline earth metal chlorides include, but are not limited to, calcium chloride, magnesium chloride and barium chloride.

In another embodiment, the solid chlorine-containing material is in the range of 50 gram to 2 kilogram per each kilogram of the spent catalyst. In another embodiment, the solid chlorine-containing material is in the range of 100 gram to 500 gram per each kilogram of the spent catalyst. In another embodiment, the solid chlorine-containing material is in the range of 50 gram to 1 kilogram per each kilogram of the spent catalyst. In another embodiment, the solid chlorine-containing material is in the range of 100 gram to 1 kilogram per each kilogram of the spent catalyst. In another embodiment, the solid chlorine-containing material is in the range of 500 gram to 2 kilogram per each kilogram of the spent catalyst.

In another embodiment, the solid silicon-containing material comprises at least one silica-containing material. In another embodiment, the silica-containing material is selected from the group consisting of: pure silica, silica-containing sand, silica-containing waste and any combination thereof. Each represents a separate embodiment of this invention. In another embodiment, the silica-containing material is pure silica. In another embodiment, the silica-containing material is silica-containing sand. In another embodiment, the silica-containing material is silica-containing waste.

In another embodiment, the solid silicon-containing material is in the range of 50 gram to 2 kilogram per each kilogram of the spent catalyst. In another embodiment, the solid silicon-containing material is in the range of 100 gram to 500 gram per each kilogram of the spent catalyst. In another embodiment, the solid silicon-containing material is in the range of 50 gram to 1 kilogram per each kilogram of the spent catalyst. In another embodiment, the solid silicon-containing material is in the range of 100 gram to 1 kilogram per each kilogram of the spent catalyst. In another embodiment, the solid silicon-containing material is in the range of 500 gram to 2 kilogram per each kilogram of the spent catalyst.

According to an embodiment of the present invention, the method includes mixing the catalyst particulate material with a solid chlorine-containing material and a solid silicon-containing material, wherein the solid silicon-containing material has a predetermined grain size in the range of 5 microns to 5 mm. In another embodiment, the grain size of the solid silicon-containing material has mean grain size between 5 microns to 100 microns. In another embodiment, the grain size of the solid silicon-containing material has mean grain size between microns to 500 microns. In another embodiment, the grain size of the solid silicon-containing material has mean grain size between 100 microns to 1 millimeters. In another embodiment, the grain size of the solid silicon-containing material has mean grain size between 5 microns to 1 millimeters. In another embodiment, the grain size of the solid silicon-containing material has mean grain size between 100 microns to 2 millimeters. In another embodiment, the grain size of the solid silicon-containing material has mean grain size between 100 microns to 3 millimeters.

In another embodiment, the grain size of the solid silicon-containing material has mean grain size between 100 microns to 4 millimeters. In another embodiment, the surface area of said silicon-containing material is in the range of 50 $m^2/gr$ to 400 $m^2/gr$. In another embodiment, the surface area of said silicon-containing material is in the range of 50 $m^2/gr$ to 100 $m^2/gr$. In another embodiment, the surface area of said silicon-containing material is in the range of 50 $m^2/gr$ to 200 $m^2/gr$. In another embodiment, the surface area of said silicon-containing material is in the range of 50 $m^2/gr$ to 300 $m^2/gr$.

According to an embodiment of the present invention, the method includes subjecting the mixture of the catalyst particulate material, the solid chlorine-containing material and the solid silicon-containing material in a reaction zone and subjecting the mixture in said reaction zone to a predetermined temperature for a predetermined time period; thereby reacting said platinum group metals with said solid chlorine-containing material and solid silicon-containing material; and provide a volatile platinum group metal-containing chloride product in said reaction zone. In another embodiment, the predetermined temperature refers to heating the mixture of the catalyst particulate material, the solid chlorine-containing material and the solid silicon-containing material. In another embodiment, the mixture is heated to a temperature between 300 degrees Celsius and 1200 degrees Celsius. In another embodiment, the mixture is heated to a temperature between 300 degrees Celsius and 1000 degrees Celsius. In another embodiment, the mixture is heated to a temperature between 500 degrees Celsius and 1000 degrees Celsius. In another embodiment, the mixture is heated for a period converting the solid to volatile. In another embodiment, the mixture is heated for between 10 minutes to 300 minutes. In another embodiment, the mixture is heated for between 10 minutes to 100 minutes. In another embodiment, the mixture is heated for between 60 minutes to 180 minutes. In another embodiment, the mixture is heated for between 90 minutes to 300 minutes.

In another embodiment, an example of the method of this invention is presented by the following equation for recovery of platinum using $CaCl_2$:

Total reaction:

$$Pt+CaCl_2+SiO_2+0.5O_2=PtCl_2+CaOSiO_2$$

The chloride salt melts on the surface ($CaCl_2$ melts at 782° C.), decomposes in the presence of oxygen and dissolves the solids (silica, platinum group metals and oxide salt). All reactions take place in the liquid phase on the surface with oxygen gas addition. Particles size and specific surface area of silica have influence on the process, as it determines the dissolution of the silica in the liquid chloride salt phase and the formation of the silicate salt.

The silica accelerates the decomposition reaction of the chloride salt in the presence of air. Silica binds the oxide salt to yield a silicate salt.

According to an embodiment of the present invention, the method includes treating said reaction zone with oxygen-containing gas. In another embodiment, the oxygen-containing gas comprises air or $O_2$. In another embodiment, the oxygen content in said oxygen-containing gas is in the range of 0.1 weight percent to 98 weight percent.

In one embodiment, this invention provides an apparatus for recovery of platinum group metals from a spent catalyst comprising:

a reaction zone with one or more inlet ports to a catalyst particulate material, a solid silicon-containing material and a solid-chlorine containing material;

a heater;

platinum group metal-containing vapor outlet port and one or more corresponding cooling manifolds through which a platinum group metal-containing vapor is released from the reaction zone;

wherein a catalyst particulate material, a solid silicon-containing material and a solid-chlorine containing material are fed into the reaction zone and the reaction mixture is heated at a predetermined temperature by the heater, providing a chemical reaction between platinum group metals, the solid-chlorine containing material and the silica to yield a volatile platinum group metal-containing chloride product.

Platinum group metal can be recovered from the platinum group metal-containing materials in the solid phase by any recovery means conventional in the art. For example, this may conveniently be achieved by dissolving the platinum group metal-containing condensed solid products in water and treating the solution with metallic zinc to reduce the platinum group metal.

The following examples are given by way of illustration, and therefore should not be construed to limit, in any manner, the scope of the present invention.

EXAMPLES

Example 1

Method A:

A catalyst with 0.45% platinum was crushed and mixed with calcium chloride and silica (Mixture composition is presented in the Table 1). Thereafter mixture was treated with air at 1050° C. All of parameters and results are presented in the Table 1.

The best results were obtained after mixing with calcium chloride and silica (Samples 1-3).

TABLE 1

Platinum extraction.

| Sample number | Catalyst quantity gr | $CaCl_2$ quantity gr | $CaCl_2$ quantity gr/kg of catalyst | $SiO_2$ quantity gr | $SiO_2$ quantity gr/kg of catalyst | Platinum extraction % |
|---|---|---|---|---|---|---|
| 1 | 100 | 70 | 700 | 120 | 1200 | 94 |
| 2 | 100 | 120 | 1200 | 70 | 700 | 91 |
| 3 | 100 | 50 | 500 | 150 | 1500 | 93 |
| 4 | 100 | 40 | 400 | 10 | 100 | 75 |
| 5 | 100 | 70 | 700 | 0 | 0 | 56 |
| 6 | 100 | 65 | 650 | 0 | 0 | 62 |
| 7 | 100 | 15 | 150 | 2 | 20 | 41 |
| 8 | 100 | 40 | 400 | 3 | 30 | 52 |

Method B:

A catalyst with 0.25% palladium was crushed and mixed with calcium chloride and silica (Mixture composition is presented in the Table 2). Thereafter mixture was treated with air at 1050° C. All of parameters and results are presented in the Table 2.

The best results were received after mixing with calcium chloride and silica (Samples 1-3).

TABLE 2

Palladium extraction.

| Sample number | Catalyst quantity gr | $CaCl_2$ quantity gr | $CaCl_2$ quantity gr/kg of catalyst | $SiO_2$ quantity gr | $SiO_2$ quantity gr/kg of catalyst | Palladium extraction % |
|---|---|---|---|---|---|---|
| 1 | 100 | 60 | 600 | 120 | 1200 | 93 |
| 2 | 100 | 120 | 1200 | 60 | 600 | 92 |
| 3 | 100 | 150 | 1500 | 150 | 1500 | 93 |
| 4 | 100 | 52 | 520 | 0 | 0 | 54 |
| 5 | 100 | 120 | 1200 | 0 | 0 | 52 |
| 6 | 100 | 15 | 150 | 2 | 20 | 15 |
| 7 | 100 | 40 | 400 | 3 | 30 | 23 |

Example 2

The method of this invention for recovery of platinum group metals from a spent catalyst as described in Example 1 is summarized in the following equation:

$$Pt+CaCl_2+SiO_2+0.5O_2=PtCl_2+CaSiO_3.$$

FIG. 1 provides XRD of the calcium silicate. The main product is a meta-calcium silicate $CaSiO_3$.

Silica accelerates the formation of $PtCl_2$ by the formation of the calcium silicate which is thermodynamic stable product (Table 3).

Results of thermodynamic calculations are provided in Table 3, comparing the Gibbs energy of a reaction including silica and without silica as one of the reagents of the reaction.

TABLE 3

Results of the thermodynamic calculations.

| Reaction | Gibbs Energy (kJ/mole) | | | | | | | |
|---|---|---|---|---|---|---|---|---|
| | 400° C. | 500° C. | 600° C. | 700° C. | 800° C. | 900° C. | 1000° C. | 1100° C. |
| 2Pd + 2CaCl$_2$ + O$_2$ = 2PdCl$_2$ gas + 2CaO | 11 | 3 | −4 | −12 | −19 | −27 | −34 | 42 |
| 2Pd + 2CaCl$_2$ + 2SiO$_2$ + O$_2$ = 2PdCl$_2$ gas + 2 CaSiO$_3$ | −171 | −176 | −185 | −192 | −199 | −206 | −213 | −220 |

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A method for recovery of platinum group metals from a spent catalyst, the method comprising:
    obtaining a catalyst particulate material comprising platinum group metals from said spent catalyst wherein said particulate material has a predetermined grain size;
    mixing said catalyst particulate material with a solid chlorine-containing material and a solid silicon-containing material in a reaction zone;
    subjecting said mixture in said reaction zone to a predetermined temperature for a predetermined time period; thereby reacting said platinum group metals with said solid chlorine-containing material and said solid silicon-containing material; and provide a volatile platinum group metal-containing chloride product in said reaction zone;
    treating said reaction zone with air, O$_2$ or combination thereof;
    cooling said volatile platinum group metal-containing chloride product in a cooling zone to convert said volatile platinum group metal-containing chloride product into a solid phase platinum group metal-containing materials.

2. The method of claim 1, wherein said solid chlorine-containing material comprises at least one chloride salt.

3. The method of claim 2, wherein said chloride salt is selected from the group consisting of: alkali metal chlorides, alkaline earth metals chlorides, aluminum chloride, ammonium chloride and any combination thereof.

4. The method of claim 1, wherein said solid silicon-containing material comprises at least one silica-containing material.

5. The method of claim 4, wherein said silica-containing material is selected from the group consisting of: pure silica, silica-containing sand, silica-containing waste and any combination thereof.

6. The method of claim 1, wherein said silica-containing material has a predetermined grain size in the range of 5 microns to 5 mm.

7. The method of claim 1, wherein a surface area of said silicon-containing material is in the range of 50 m$^2$/gr to 400 m$^2$/gr.

8. The method of claim 1, wherein said predetermined grain size of said catalyst particulate material is in the range of 30 microns to 200 mm.

9. The method of claim 1, wherein said solid chlorine-containing material is in the range of 50 gram to 2 kilogram per each kilogram of the spent catalyst.

10. The method of claim 1, wherein said solid silicon-containing material is in the range of 50 gram to 2 kilogram per each kilogram of the spent catalyst.

11. The method of claim 1, wherein oxygen content in said oxygen, air or combination thereof is in the range of 0.1 weight percent to 98 weight percent.

12. The method of claim 1, wherein said predetermined temperature in the reaction zone is in the range of 300 degrees Celsius to 1200 degrees Celsius.

13. The method of claim 1, wherein said predetermined time period for heating said mixture is in the range of 10 min to 300 min.

14. The method of claim 1, wherein the step of obtaining of a catalyst particulate material comprising platinum group metals comprises crushing said spent catalyst to obtain a catalyst particulate material.

* * * * *